(12) United States Patent
Fukuda et al.

(10) Patent No.: US 10,122,050 B2
(45) Date of Patent: Nov. 6, 2018

(54) DEFORMATION DETECTION SENSOR FOR SEALED SECONDARY BATTERY, SEALED SECONDARY BATTERY, AND DEFORMATION DETECTION METHOD FOR SEALED SECONDARY BATTERY

(71) Applicant: TOYO TIRE & RUBBER CO., LTD., Osaka-shi, Osaka (JP)

(72) Inventors: Takeshi Fukuda, Osaka (JP); Takahiro Ohta, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 6 days.

(21) Appl. No.: 15/308,970

(22) PCT Filed: Jun. 4, 2015

(86) PCT No.: PCT/JP2015/066155
§ 371 (c)(1),
(2) Date: Nov. 4, 2016

(87) PCT Pub. No.: WO2015/198821
PCT Pub. Date: Dec. 30, 2015

(65) Prior Publication Data
US 2017/0098871 A1 Apr. 6, 2017

(30) Foreign Application Priority Data
Jun. 27, 2014 (JP) .................................. 2014-132536

(51) Int. Cl.
*H01M 10/48* (2006.01)
*G01D 5/12* (2006.01)
(Continued)

(52) U.S. Cl.
CPC .............. *H01M 10/48* (2013.01); *G01B 7/24* (2013.01); *G01D 5/12* (2013.01); *G01D 11/24* (2013.01);
(Continued)

(58) Field of Classification Search
CPC combination set(s) only.
See application file for complete search history.

(56) References Cited

U.S. PATENT DOCUMENTS 5,680,029 A 10/1997 Smits et al.
2006/0093896 A1 5/2006 Hong et al.
(Continued)

FOREIGN PATENT DOCUMENTS

JP 10-502767 A 3/1998
JP 2006-128062 A 5/2006
(Continued)

OTHER PUBLICATIONS

JP2009076265 (English translation) Apr. 2009. Japan. Kawabe et al.*
(Continued)

*Primary Examiner* — Jonathan G Leong
*Assistant Examiner* — Christopher P Domone
(74) *Attorney, Agent, or Firm* — Westerman, Hattori, Daniels & Adrian, LLP

(57) ABSTRACT

The present invention provides a deformation detection sensor for a sealed secondary battery, that makes it possible to detect deformation resulting from swelling of a cell with a high degree of sensitivity, that does not restrict capacity, and that has excellent stability. The deformation detection sensor for a sealed secondary battery includes a polymer matrix layer 3 and a detection unit 4. The polymer matrix layer 3 contains a magnetic filler that is dispersed therein and that changes an external field in accordance with deforma- (Continued)

tion of the polymer matrix layer 3. The detection unit 4 detects change in the external field. The polymer matrix layer 3 is sandwiched in a gap between adjacent cells 2 and mounted in a compressed state.

10 Claims, 4 Drawing Sheets

(51) Int. Cl.
*G01D 11/24* (2006.01)
*H01M 10/42* (2006.01)
*H01M 10/0525* (2010.01)
*H01M 2/10* (2006.01)
*G01B 7/24* (2006.01)
*G01L 1/12* (2006.01)

(52) U.S. Cl.
CPC ............. *G01L 1/12* (2013.01); *H01M 2/10* (2013.01); *H01M 10/0525* (2013.01); *H01M 10/4285* (2013.01); *H01M 2220/20* (2013.01)

(56) References Cited

U.S. PATENT DOCUMENTS

| | | | |
|---|---|---|---|
| 2006/0246345 | A1 | 11/2006 | Yoon et al. |
| 2010/0247980 | A1 | 9/2010 | Jang et al. |
| 2013/0089765 | A1 | 4/2013 | Murayama et al. |
| 2015/0253207 | A1* | 9/2015 | Shigeto .......... G01B 7/24 73/862.625 |

FOREIGN PATENT DOCUMENTS

| | | | |
|---|---|---|---|
| JP | 2008-535174 A | | 8/2008 |
| JP | 2008-234840 A | | 10/2008 |
| JP | 2009-76265 A | | 4/2009 |
| JP | 2009076265 | * | 4/2009 |
| JP | 2010-209286 A | | 9/2010 |
| JP | 2011-505650 A | | 2/2011 |
| JP | 2011-95019 A | | 5/2011 |
| JP | 2011-142003 A | | 7/2011 |
| JP | 2013-171697 A | | 9/2013 |
| JP | 2014-98688 A | | 5/2014 |
| JP | 2014-98689 A | | 5/2014 |
| WO | 2011/029575 A1 | | 3/2011 |
| WO | 2012/073770 A1 | | 6/2012 |

OTHER PUBLICATIONS

Notification of Transmittal of Translation of the International Preliminary Report on Patentability (Form PCT/IB/338) issued in counterpart International Application No. PCT/JP2015/066155 dated Jan. 5, 2017, with Forms PCT/IB/373 and PCT/ISA/237. (8 pages).
Extended (supplementary) European Search Report dated Mar. 23, 2017, issued in counterpart European Patent Application No. 15811718.4. (7 pages).
Office Action dated Aug. 9, 2017, issued in counterpart Japanese Application No. 2014-132536, with English translation. (9 pages).
Office Action dated Sep. 28, 2017, issued in counterpart Japanese Application No. 2014-132536, with English translation. (10 pages).
International Search Report dated Aug. 4, 2015, issued in counterpart International Application No. PCT/JP2015/066155 (2 pages).
European Office Action dated Jul. 6, 2018, issued in European Application No. 15811718.4. (5 pages).
Office Action dated Aug. 21, 2018, issued in counterpart Chinese Application No. 2015800257738, with English translation. (18 pages).

\* cited by examiner

DEFORMATION DETECTION SENSOR FOR SEALED SECONDARY BATTERY, SEALED SECONDARY BATTERY, AND DEFORMATION DETECTION METHOD FOR SEALED SECONDARY BATTERY

TECHNICAL FIELD

The present invention relates to a sensor for detecting deformation of a sealed secondary battery, a sealed secondary battery including the sensor mounted thereon, and a method for detecting deformation of a sealed secondary battery.

BACKGROUND ART

In recent years, a sealed secondary battery (which may be hereinafter simply referred to as "secondary battery") represented by a lithium ion secondary battery is used as a power source not only for a mobile apparatus such as a portable phone or a notebook personal computer but also for an electrically driven vehicle such as an electric automobile or a hybrid car. A cell constituting the secondary battery includes an electrode group formed by winding or stacking a positive electrode and a negative electrode with a separator interposed therebetween, and an outer casing that accommodates the electrode group. Generally, a laminate film or a metal can is used as the outer casing, and the electrode group is accommodated together with an electrolytic solution in a sealed space located in the inside of the outer casing.

For use that requires a high voltage such as in a power source for the above-described electrically driven vehicles, the secondary battery is used in a form of a battery module or a battery pack that includes a plurality of cells. In the battery module, a plurality of cells connected in series is accommodated in a case. For example, four cells are connected in an array of two in parallel by two in series or in an array of four in series. Also, in the battery pack, various apparatus such as a controller are accommodated in the case in addition to the plurality of battery modules connected in series. In the secondary battery used in the power source for an electrically driven vehicle, the case of the battery pack is formed in a shape that is suitable for mounting on the vehicle.

In the meantime, such a secondary battery has a problem that, when the electrolytic solution is decomposed due to overcharging or the like, the cells swell in accordance with the rise in internal pressure caused by the decomposition gas, whereby the secondary battery is deformed. In that case, ignition occurs unless the charging current or the discharging current is stopped. In the worst case, the ignition results in rupture of the secondary battery. Therefore, in preventing rupture of the secondary battery, it is important to detect deformation of the secondary battery resulting from swelling of the cells with a high degree of sensitivity so that the charging current or the discharging current can be stopped at a suitable time.

Patent Document 1 discloses a method in which, in a battery module having a plurality of cells, a sensor insertion space is formed in the battery module for mounting a temperature sensor that senses a temperature of the cells. However, by such a technique of using the temperature sensor, a space for mounting the sensor is separately provided, so that the capacity of the secondary battery is restricted to an extent more than needed.

Also, Patent Document 2 discloses a method of reducing the charging current or the discharging current of the secondary battery by bonding a strain gauge onto a surface of a case (one example of the outer casing) of the cell and detecting change in a resistance value of the strain gauge in accordance with the swelling of the case. However, by such a technique of using the strain gauge, there is a fear that the stability of the sensor may lower due to fluctuation of the sensor characteristics resulting from positional shift of the strain gauge or the like by vibration particularly during the use for a long period of time.

PRIOR ART DOCUMENTS

Patent Documents

Patent Document 1: JP-A-2013-171697
Patent Document 2: JP-A-2006-128062

SUMMARY OF THE INVENTION

Problems to be Solved by the Invention

The present invention has been made in view of the above-described circumstances, and an object thereof is to provide a deformation detection sensor for a sealed secondary battery, that makes it possible to detect deformation of the sealed secondary battery resulting from swelling of a cell with a high degree of sensitivity, and that nonetheless does not restrict capacity, and that has excellent stability, a sealed secondary battery, and a deformation detection method for a sealed secondary battery.

Means for Solving the Problems

The object can be achieved by the following present invention. The present invention provides a deformation detection sensor for a sealed secondary battery, comprising a polymer matrix layer and a detection unit, wherein the polymer matrix layer contains a filler that is dispersed therein and that changes an external field in accordance with deformation of the polymer matrix layer, and the detection unit detects change in the external field; and the polymer matrix layer is sandwiched in a gap and mounted in a compressed state.

The polymer matrix layer is sandwiched in a gap and mounted in a compressed state. When the secondary battery is deformed due to swelling of a cell, the polymer matrix layer is deformed in accordance therewith. The detection unit detects change in the external field resulting from deformation of the polymer matrix layer. This allows that the deformation of the secondary battery can be detected with a high degree of sensitivity. The polymer matrix layer mounted in the above-described manner does not restrict capacity of the secondary battery and, moreover, positional shift caused by vibration or the like is suppressed, resulting in stabilization of the sensor characteristics.

In the deformation detection sensor for a sealed secondary battery according to the present invention, it is preferable that the polymer matrix layer contains a magnetic filler as the filler, and the detection unit detects change in a magnetic field as the external field. With such a construction, change in the magnetic field accompanying the deformation of the polymer matrix layer can be detected without a wire. Also, because a Hall element having a wide sensitivity region can be used as the detection unit, detection with a high degree of sensitivity can be made in a wider range.

It is preferable that a compression ratio of the polymer matrix layer is from 1.05 to 2.0. When the compression ratio is less than 1.05, the effect of suppressing positional shift of the polymer matrix layer tends to decrease, thereby lowering the stability of the sensor. Also, when the compression ratio exceeds 2.0, there are cases in which the polymer matrix layer is excessively compressed and can hardly be deformed. The compression ratio is determined as a ratio of the thickness in a non-compressed state relative to the thickness in a compressed state (thickness in a non-compressed state/ thickness in a compressed state).

It is preferable that an Asker C hardness of the polymer matrix layer is from 1 to 50. When the Asker C hardness (which may be hereinafter simply referred to as "C hardness") is 1 or more, the handling property of the polymer matrix layer is enhanced, and also deterioration of the stability of the sensor can be more easily suppressed. Also, when the C hardness is 50 or less, the polymer matrix layer becomes flexible and can be easily deformed, whereby the sensor sensitivity can be enhanced successfully.

It is preferable that the polymer matrix layer is a foamed body containing bubbles. In this case, the polymer matrix layer Can be easily compressed, which is advantageous in mounting the polymer matrix layer in a compressed state as described above, and the sensor has more excellent stability. Also, the polymer matrix layer can be easily deformed, so that it is convenient in enhancing the sensor sensitivity.

It is preferable that a bubble content ratio of the foamed body is from 20 to 80 vol %. When the bubble content ratio is 20 vol % or more, the polymer matrix layer becomes flexible and can be easily deformed, whereby the sensor sensitivity can be enhanced successfully. Also, when the bubble content ratio is 80 vol % or less, the polymer matrix layer is prevented from becoming brittle, so that the handling property of the polymer matrix layer and the stability of the sensor can be enhanced.

It is preferable that an average bubble diameter of the foamed body is from 50 to 300 μm. When the average bubble diameter is less than 50 μm, the stability of the sensor characteristics tends to be deteriorated due to increase in the amount of the foam stabilizer. Also, when the average bubble diameter exceeds 300 μm, the area of contact with the cell serving as an object of detection or the like tends to decrease, thereby lowering the stability of the sensor.

It is preferable that an independent-bubble ratio of the foamed body is from 5 to 70%. This allows that excellent stability of the sensor can be exhibited while ensuring the compressibility of the polymer matrix layer.

The sealed secondary battery according to the present invention is one in which the above-described deformation detection sensor is mounted, and the form thereof may be either a single battery module or a battery pack that includes a plurality of battery modules. In such a sealed secondary battery, deformation resulting from swelling of a cell is detected by the deformation detection sensor with a high degree of sensitivity. Nonetheless, capacity of the secondary battery is not restricted by the deformation detection sensor, and the sensor characteristics thereof are stabilized.

The present invention provides a deformation detection method for a sealed secondary battery, in which a polymer matrix layer is mounted in a compressed state in a form of being sandwiched in a gap, and the polymer matrix layer contains a filler that is dispersed therein and that changes an external field in accordance with deformation of the polymer matrix layer, the method comprising detecting change in the external field accompanying the deformation of the polymer matrix layer, and detecting deformation of the sealed secondary battery on a basis of the detected chance in the external field.

The polymer matrix layer is sandwiched in a gap and mounted in a compressed state. When the secondary battery deformed due to swelling of a cell, the polymer matrix layer is deformed in accordance therewith. By detecting change in the external field resulting from deformation of the polymer matrix layer, deformation of the secondary battery can be detected with a high degree of sensitivity. The polymer matrix layer mounted in the above-described manner does not restrict capacity of the secondary battery and, moreover, positional shift caused by vibration or the like is suppressed, resulting in stabilization of the sensor characteristics.

MODE FOR CARRYING OUT THE INVENTION

An embodiment of the present invention will be explained.

Figure 1:
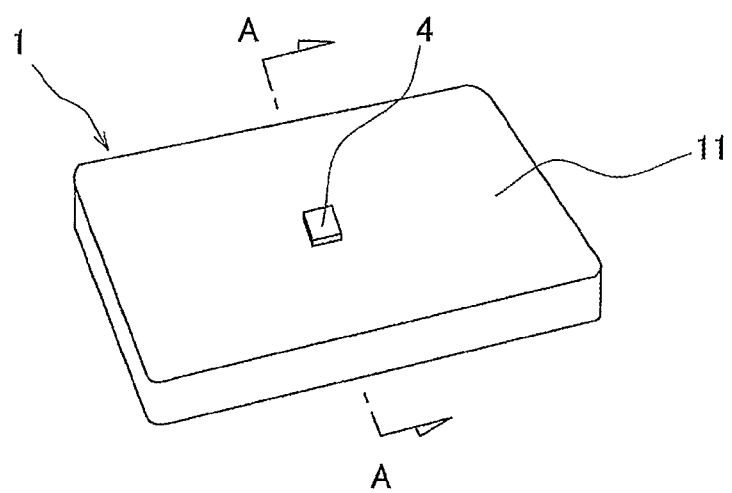
FIG. 1 is a perspective view schematically illustrating one example of a battery module.
Figure 2:
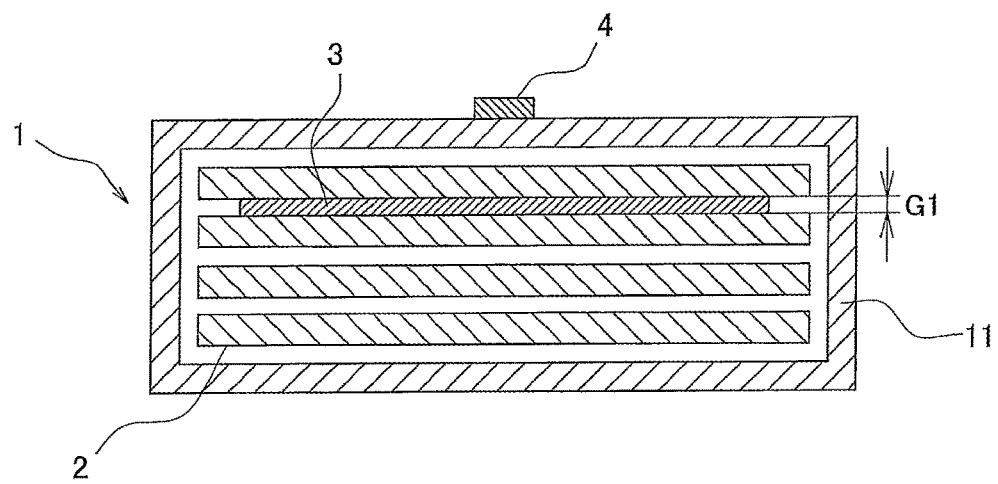
FIG. 2 is a sectional view schematically illustrating a cross-section cut along a direction indicated by an arrow A-A of FIG. 1.

A battery module 1 shown in FIGS. 1 and 2 has a plurality of cells 2 in an inside of a case 11 thereof. In the present embodiment, four cells 2 are connected in series (for example, in an array of two in parallel by two in series or in an array of four in series). Although not illustrated in detail, the cell 2 includes an electrode group formed by winding or stacking a positive electrode and a negative electrode with a separator interposed therebetween, and an outer casing that accommodates the electrode group. The electrode group is accommodated together with an electrolytic solution in a sealed space located in the inside of the outer casing. As the outer casing of the cell 2, a laminate film such as an aluminum laminate foil is used however, in place of the laminate film, a metal can having a cylindrical shape or a prismatic shape can be use as well.

This battery module 1 is a lithium ion secondary battery that can be used as a power source for an electrically driven vehicle, and is mounted in a form of a battery pack on the vehicle. In the battery pack, a plurality of battery modules 1 connected in series are accommodated in the case together with various apparatus such as a controller. The case of the battery pack is formed in a shape suitable for mounting on a vehicle, for example, in a shape that accords with the under-floor shape of the vehicle. In the present invention, the sealed secondary battery is not limited to a non-aqueous electrolyte secondary battery such as a lithium ion battery, but may be an aqueous electrolyte secondary battery such as a nickel hydrogen battery battery.

Figure 3:
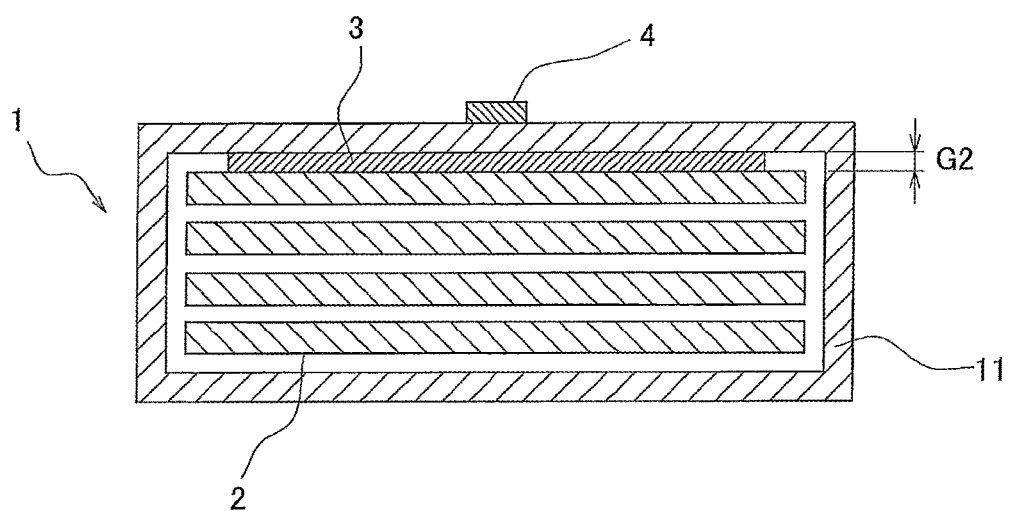
FIG. 3 is sectional view illustrating another example of a site where a polymer matrix layer is attached.

As illustrated in FIG. 2, a deformation detection sensor is mounted on the sealed secondary battery, and the deformation detection sensor includes a polymer matrix layer 3 and a detection unit 4. The polymer matrix layer 3 is attached to a surface of the cell 2 (outer surface of the outer casing), and an adhesive agent or an adhesive tape is used for the attaching thereof as necessary. The polymer matrix layer 3 is formed in a sheet form and is disposed in a gap in the secondary battery, for example, in a gap between adjacent cells 2 or in a gap between a cell 2 and a case 11 that accommodates the cell 2 as illustrated in FIG. 3. The polymer matrix layer 3 may also be attached, in a folded state, to a corner part of the cell 2 or the case 11.

The polymer matrix layer 3 contains a filler that is dispersed therein and that changes an external field in accordance with deformation of the polymer matrix layer 3. The detection unit 4 detects change in the external field. The detection unit 4 is disposed to be distant from the polymer matrix layer 3 to such an extent that the change in the external field can be detected, and is preferably attached to a comparatively firm site that is hardly affected by the swelling of the cell 2. In the present embodiment, the detection unit 4 is attached to an outer surface of the case 11; however, the present invention is not limited to this form, and the detection unit 4 may be attached to an inner surface of the case 11 or to a case of the battery pack. These cases are formed, for example, of a metal or a plastic, and there may be cases in which a laminate film is used as the case of the battery module.

The polymer matrix layer 3 shown in FIG. 2 is sandwiched in a gap and mounted in a compressed state. In this example, the polymer matrix layer 3 is sandwiched in a gap between adjacent cells 2 and mounted in a compressed state. The thickness of the polymer matrix layer 3 in a non-compressed state is larger than the gap G1 in which the polymer matrix layer 3 is disposed, and the polymer matrix layer 3 is compressed in a thickness direction thereof. The polymer matrix layer 3 shown in FIG. 3 also is sandwiched in a gap and mounted in a compressed state. In this example, the polymer matrix layer 3 is sandwiched in a gap between the cell 2 and the case 11 and mounted in a compressed state. The thickness of the polymer matrix layer 3 in a non-compresses state is larger than the gap G2 in which the polymer matrix layer 3 is disposed, and this polymer matrix layer 3 also is compressed in a thickness direction thereof.

When the cell 2 swells, the polymer matrix layer 3 is deformed in accordance therewith, and change in the external field accompanying the deformation of the polymer matrix layer 3 is detected by the detection unit 4. A detection signal that is output from the detection unit 4 is forwarded to a controlling apparatus not illustrated in the drawings. When change in the external field larger than or equal to a set value is detected by the detection unit 4, a switching circuit that is not illustrated in the drawings and that is connected to the controlling apparatus shuts off the energization and stops the charging current or the discharging current. In this manner, deformation of the secondary battery resulting from swelling of the cell 2 is detected with a high degree of sensitivity, and rupture of the secondary battery is prevented. This deformation does not restrict capacity of the secondary battery, and the sensor characteristics are stabilized because the positional shift is suppressed.

In each of the examples of FIGS. 2 and 3, one polymer matrix layer 3 and one detection unit 4 are shown; however, a plurality of polymer matrix layers 3 or a plurality of detection units 4 may be used in accordance with various conditions such as the shape or the size of the secondary battery. In such a case, a polymer matrix layer 3 mounted as shown in FIG. 2 and a polymer matrix layer 3 mounted as shown in FIG. 3 may coexist. Further, the secondary battery may be constructed in such a manner that a plurality of polymer matrix layers 3 are attached to one cell 2 or that change in the external field accompanying the deformation of one polymer matrix layer 3 is detected by a plurality of detection units 4.

In the present embodiment, the polymer matrix layer 3 contains a magnetic filler as the above-described filler, and the detection unit 4 detects change in a magnetic field as the above-described external field. In this case, the polymer matrix layer 3 is preferably a magnetic elastomer layer in which the magnetic filler is dispersed in a matrix that contains an elastomer component.

The magnetic filler may be, for example, a rare-earth-based, iron-based, cobalt-based, nickel-based, or oxide-based filler; however, a rare-earth-based filler is preferable because a higher magnetic force can be obtained. The shape of the magnetic filler is not particularly limited, so that the shape may be any one of spherical, flattened, needle-like, prismatic, and amorphous shapes. The average particle size of the magnetic filler is preferably from 0.02 to 500 μm, more preferably from 0.1 to 400 μm, and still more preferably from 0.5 to 300 μm. When the average particle size is smaller than 0.02 μm, the magnetic characteristics of the magnetic filler tend to deteriorate. On the other hand, when the average particle size exceeds 500 μm, the mechanical properties of the magnetic elastomer layer tend to deteriorate, and the magnetic elastomer layer tends to be brittle.

The magnetic filler may be introduced into the elastomer after magnetization; however, it is preferable to magnetize the magnetic filler after introduction into the elastomer. By magnetization after introduction into the elastomer, the polarity of the magnet can be easily controlled, and the magnetic field can be easily detected.

A thermoplastic elastomer, a thermosetting elastomer, or a mixture of these can be used as the elastomer component. Examples of the thermoplastic elastomer include a styrene-based thermoplastic elastomer, a polyolefin-based thermoplastic elastomer, a polyurethane-based thermoplastic elastomer, a polyester-based thermoplastic elastomer, a polyamide-based thermoplastic elastomer, a polybutadiene-based thermoplastic elastomer, a polyisoprene-based thermoplastic elastomer, and a fluororubber-based thermoplastic elastomer. Also, examples of the thermosetting elastomer include diene-based synthetic rubbers such as polyisoprene rubber, polybutadiene rubber, styrene-butadiene rubber, polychloroprene rubber, nitrile rubber, and ethylene-propylene rubber, non-diene-based synthetic rubbers such as ethylene-propylene rubber, butyl rubber, acrylic rubber, polyurethane rubber, fluororubber, silicone rubber, and epichlorohydrin rubber, and natural rubbers. Among these, a thermosetting elastomer is preferable, and this is because settling of the magnetic elastomer accompanying the heat generation or overloading of the battery can be suppressed. Further, a polyurethane rubber (which may also be referred to as a polyurethane elastomer) or a silicone rubber (which may also be referred to as a silicone elastomer) is more preferable.

A polyurethane elastomer can be obtained by reacting a polyol with a polyisocyanate. In the case in which the polyurethane elastomer is used as the elastomer component, a magnetic filler is mixed with a compound containing active hydrogen, and further an isocyanate component is added thereto to obtain a mixture liquid. Also, a mixture liquid can also be obtained by mixing a magnetic filler with an isocyanate component, and mixing a compound containing active hydrogen thereto. The magnetic elastomer can be produced by injecting the mixture liquid into a mold that has been subjected to a releasing treatment, and thereafter heating the mixture liquid up to a curing temperature for curing. Also, in the case in which a silicone elastomer is used as the elastomer component, the magnetic elastomer can be produced by putting a magnetic filler into a precursor of a silicone elastomer, mixing the components, putting the resulting mixture into a mold, and thereafter heating the mixture for curing. A solvent may be added as necessary.

A compound known in the art in the field of polyurethane can be used as the isocyanate component that can be used in the polyurethane elastomer. Examples of the isocyanate component include aromatic diisocyanates such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, 1,5-naphthalene diisocyanate, p-phenylene diisocyanate, m-phenylene diisocyanate, p-xylylene diisocyanate, and m-xylylene diisocyanate, aliphatic diisocyanates such as ethylene diisocyanate, 2,2,4-trimethylhexamethylene diisocyanate, and 1,6-hexamethylene diisocyanate, and alicyclic diisocyanates such as 1,4-cyclohexane diisocyanate, 4,4'-dicyclohexylmethane diisocyanate, isophorone diisocyanate, and norbornane diisocyanate. These may be used either alone or as a mixture of two or more kinds. Also, the isocyanate component may be a modified component such as a urethane-modified, allophanate-modified, biuret-modified, or isocyanurate-modified component. Preferable isocyanate components are 2,4-toluene diisocyanate, 2,6-toluene diisocyanate, and 4,4'-diphenylmethane diisocyanate. 2,4-toluene diisocyanate or 2,6-toluene diisocyanate is more preferable.

A compound typically used in the technical field of polyurethane can be used as the compound containing active hydrogen. Examples of the compound containing active hydrogen include high-molecular-weight polyols such as polyether polyols represented by polytetramethylene glycol, polypropylene glycol, polyethylene glycol, and a copolymer of propylene oxide and ethylene oxide, polyester polyols represented by polybutylene adipate, polyethylene adipate, and 3-methyl-1,5-pentane adipate, polyester polycarbonate polyols typified by reaction products of alkylene carbonate and polyester glycol such as polycaprolactone polyol or polycaprolactone, polyester polycarbonate polyols obtained by reacting ethylene carbonate with a polyhydric alcohol and subsequently reacting the obtained reaction mixture with an organic dicarboxylic acid, and polycarbonate polyols obtained by transesterification reaction of a polyhydroxyl compound and aryl carbonate. These may be Used either alone or as a mixture of two or more kinds.

In addition to the above-described high-molecular-weight polyol components, low-molecular-weight polyol components such as ethylene glycol, 1,2-propylene glycol, 1,3-propylene glycol, 1,4-butanediol, 1,6-hexanediol, neopentyl glycol, 1,4-cyclohexanedimethanol, 3-methyl-1,5-pentanediol, diethylene glycol, triethylene glycol, 1,4-bis(2-hydroxyethoxy)benzene, trimethylolpropane, glycerin, 1,2,6-hexanetriol, pentaerythritol, tetramethylolcyclohexane, methylglucoside, sorbitol, mannitol, dulcitol, sucrose, 2,2,6,6-tetrakis(hydroxymethyl)cyclohexanol, and triethanolamine, and low-molecular-weight polyamine components such as ethylenediamine, tolylenediamine, diphenylmethanediamine, and diethylenetriamine may be used as the compound containing active hydrogen. These may be used either alone or as a mixture of two or more kinds. Further, polyamines typified by 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethyleneglycol-di-p-aminobenzoate, polytetramethyleneoxide-di-p-aminobenzoate, 1,2-bis(2-aminophenylthio)ethane, 4,4'-diamino-3,3'-diethyl-5,5'-dimethyldiphenylmethane, N,N'-di-sec-butyl-4,4'-diaminodiphenylmethane, 4,4'-diamino-3,3'-diethyldiphenylmethane, 4,4'-diamino-3,3'-diethyl-5,5'-dimethyldiphenylmethane, 4,4'-diamino-3,3'-diisopropyl-5,5'-dimethyldiphenylmethane, 4,4'-diamino-3,3',5,5'-tetraethyldiphenylmethane, 4,4'-diamino-3,3',5,5'-tetraisopropyldiphenylmethane, m-xylylenediamine, N,N'-di-sec-butyl-p-phenylenediamine, m-phenylenediamine, and p-xylylenediamine may also be mixed. Preferable compounds containing active hydrogen are polytetramethylene glycol, polypropylene glycol, a copolymer of propylene oxide and ethylene oxide, and a polyester polyol made of 3-methyl-1,5-pentanediol and adipic acid. More preferable compounds containing active hydrogen are polypropylene glycol and a copolymer of propylene oxide and ethylene oxide.

A preferable combination of the isocyanate component and the compound containing active hydrogen is a combination of one kind or two more kinds of 2,4-toluene diisocyanate, 2,6-toluene diisocyanate, and 4,4'-diphenylmethane diisocyanate as the isocyanate component and one kind or two more kinds of polytetramethylene glycol, polypropylene glycol, a copolymer of propylene oxide and ethylene oxide, and 3-methyl-1,5-pentane adipate as the compound containing active hydrogen. A more preferable combination is a combination of 2,4-toluene diisocyanate and/or 2,6-toluene diisocyanate as the isocyanate component and polypropylene glycol and/or a copolymer of propylene oxide and ethylene oxide as the compound containing active hydrogen.

The amount of the magnetic filler in the magnetic elastomer is preferably 1 to 450 parts by weight, more preferably 2 to 400 parts by weight, relative to 100 parts by weight of the elastomer component. When the amount is smaller than 1 part by weight, detection of change in the magnetic field tends to be difficult. When the amount exceeds 450 parts by weight, the magnetic elastomer itself may in some cases become brittle.

As the detection unit 4 for detecting change in the magnetic field, a magnetic resistance element, a Hall element, an inductor, an MI element, a flux gate sensor, or the like can be used, for example. As the magnetic resistance element, a semiconductor compound magnetic resistance element, an anisotropic magnetic resistance element (AMR), a gigantic magnetic resistance element (GMR), and a tunnel magnetic resistance element (TMR) may be mentioned as examples. Among these, a Hall element is preferable, and this is because the Hall element has high sensitivity in a wide range, and is useful as the detection unit 4.

The thickness of the polymer matrix layer 3 in a non-compressed state is preferably from 300 to 3000 μm, more preferably from 400 to 2000 μm, and still more preferably from 500 to 1500 μm. When the thickness is smaller than 300 μm, the handling property of the polymer matrix layer 3 tends to be deteriorated because the polymer matrix layer 3 becomes brittle when a required amount of the filler is added. On the other hand, when the thickness is larger than 3000 μm, the sensor sensitivity may in some cases decrease because the polymer matrix layer 3 is excessively compressed and becomes less likely to be deformed when the polymer matrix layer 3 is disposed in the gap as described above.

The compression ratio of the polymer matrix layer 3 is preferably from 1.05 to 2.0, more preferably from 1.1 to 1.8. When the compression ratio is less than 1.05, the effect of suppressing the positional shift of the polymer matrix layer 3 decreases, and the stability of the sensor tends to decrease. Also, when the compression ratio exceeds 2.0, the sensor sensitivity may in some cases decrease because the polymer matrix layer 3 is excessively compressed and becomes less likely to be deformed. The thickness of the polymer matrix layer 3 in a compressed state corresponds to the size of the gap in which the polymer matrix layer 3 is mounted (G1 in FIG. 2 and G2 in FIG. 3).

The Asker C hardness of the polymer matrix layer 3 is preferably from 1 to 50, more preferably from: 4 to 45. When the C hardness is 1 or larger, the handling property of the polymer matrix layer 3 is enhanced, and deterioration of the stability of the sensor can be more easily suppressed. Also, when the C hardness is 50 or smaller, the polymer matrix layer 3 becomes flexible and can be easily deformed, so that the sensor sensitivity can be enhanced successfully. The C hardness is measured in accordance with JIS K-7312.

For the purpose of preventing rusts of the magnetic filler or the like, a sealing material for sealing the polymer matrix layer 3 may be provided to such a degree that the flexibility of the polymer matrix layer 3 is not deteriorated. A thermoplastic resin, a thermosetting resin, or a mixture of these may be used as the sealing material. The thermoplastic resin may be, for example, styrene-based thermoplastic elastomer, polyolefin-based thermoplastic elastomer, polyurethane-based thermoplastic elastomer, polyester-based thermoplastic elastomer, polyamide-based thermoplastic elastomer, polybutadiene-based thermoplastic elastomer, polyisoprene-based thermoplastic elastomer, fluorine-based thermoplastic elastomer, ethylene ethyl acrylate copolymer, ethylene•vinyl acetate copolymer, polyvinyl chloride, polyvinylidene chloride, chlorinated polyethylene, fluororesin, polyamide, polyethylene, polypropylene, polyethylene terephthalate, polybutylene terephthalate, polystyrene, polybutadiene, or the like. The thermosetting resin may be, for example, diene-based synthetic rubbers such as polyisoprene rubber, polybutadiene rubber, styrene•butadiene rubber, polychloroprene rubber, and acrylonitrile•butadiene rubber, non-diene-based rubbers such as ethylene•propylene rubber, ethylene•propylene•diene rubber, butyl rubber, acrylic rubber, polyurethane rubber, fluorine-containing rubber, silicone rubber, and epichlorohydrin rubber, natural rubbers, and thermosetting resins such as polyurethane resin, silicone resin, epoxy resin, or the like.

The polymer matrix layer 3 may be a non-foamed body that does not contain bubbles. However, in view of enhancing the stability of the sensor and the sensor sensitivity, and further in view of reducing the weight, the polymer matrix layer 3 is preferably a foamed body that contains bubbles. General resin foam can be used as the foamed body. However, in view of the characteristics such as compression set, it is preferable to use a thermosetting resin foam. Examples of the thermosetting resin foam include polyurethane resin foam and silicone resin foam. Among these, polyurethane resin foam is preferable. The isocyanate component and the compound containing active hydrogen that have been listed above can be used for the polyurethane resin foam.

A known catalyst can be used without limitation as the catalyst to be used in the polyurethane resin foam; however, a tertiary amine catalyst such as triethylenediamine (1,4-diazabicyclo[2,2,2]octane), N,N,N',N'-tetramethylhexanediamine, or bis(2-dimethylaminoethyl)ether, or a metal catalyst such as tin octylate, lead octylate, zinc octylate, or bismuth octylate can be used. These may be used either alone or in combination of two or more kinds.

Commercially available products of the above catalysts include "VEDA-L33" manufactured by Tosoh Corporation, "NIAX CATALYST A1" manufactured by Momentive Performance Materials Inc., "KAOLIZER NO. 1" and "KAOLIZER NO. 30P" manufactured by Kao Corporation, "DABCO T-9" manufactured by Air Products and Chemicals, Inc., "BTT-24" manufactured by Toei Chemical Industry Co., Ltd., and "PUCAT25" manufactured by Nihon Kagaku Sangyo Co., Ltd.

As a foam stabilizer to be used in the polyurethane resin foam, it is possible to use a foam stabilizer that is used in producing an ordinary polyurethane resin foam, such as a silicone-based foam stabilizer or a fluorine-based foam stabilizer. A silicone-based surfactant or a fluorine-based surfactant that is used in the silicone-based foam stabilizer or fluorine-based foam stabilizer has a part that is soluble in polyurethane and a part that is insoluble in polyurethane in a molecule. Because the insoluble part disperses the polyurethane-based material uniformly to reduce the surface tension of the polyurethane-based material, the bubbles are more easily generated and are less likely to be broken. Of course, when the surface tension is lowered too much, the bubbles are less likely to be generated when, for example, the silicone-based surfactant is used in the resin foam of the present invention, a dimethylpolysiloxane structure serving as the insoluble part makes it possible to reduce the bubble diameter or to increase the number of bubbles.

Commercially available products of the silicone-based foam stabilizers include "SF-2962," "SRX 274DL," "SF-2965," "SF-2904," "SF-2908," "SF-2904," and "L5340" manufactured by Dow Corning Toray Co., Ltd., and "TEGOSTAB B-8.017," "B-8465," and "B-8443" manufactured by Evonik•Degussa AG. Also, commercially available products of the fluorine-based foam stabilizers include "FC430" and "FC4430" manufactured by 3M Company, and "FC142D," "F552," "F554," "F558," "F561," and "R41" manufactured by Dainippon Ink and Chemicals, Incorporated.

The amount of the foam stabilizer blended is preferably from 1 to 15 parts by mass, more preferably from 2 to 12 parts by mass, relative to 100 parts by mass of the resin component. When the amount of the foam stabilizer blended is less than 1 part by mass, the foaming is insufficient. When the amount of the foam stabilizer blended exceeds 10 parts by mass, there is a possibility of bleeding out.

The bubble content ratio of the foamed body constituting the polymer matrix layer 3 is preferably from 20 to 80 vol %. When the bubble content ratio is 20 vol % or more, the polymer matrix layer 3 becomes flexible and can be easily deformed, whereby the sensor sensitivity can be enhanced successfully. Also, when the bubble content ratio is 80 vol % or less, the polymer matrix layer 3 is prevented from becoming brittle, so that the handling property and the stability of the sensor can be enhanced. The bubble content ratio can be determined by performing specific gravity measurement in accordance with JIS Z-8807-1976, and performing calculation based on the measured specific gravity value and the specific gravity value of a non-foamed body.

The average bubble diameter of the foamed body constituting the polymer matrix layer 3 is preferably from 50 to 300 µm. Also, the average opening diameter of the foamed body thereof is preferably from 15 to 100 µm. When the average bubble diameter is less than 50 µm or when the average opening diameter is less than 15 µm, the stability of the sensor characteristics tends to be deteriorated due to increase in the amount of the foam stabilizer. Also, when the average bubble diameter exceeds 300 µm or the average opening diameter exceeds 100 µm, the area of contact with the cell serving as an object of detection or the like tends to decrease, thereby lowering the stability of the sensor. The average bubble diameter and the average opening diameter can be determined as follows. A cross-section of the polymer matrix layer is observed with a SEM at a magnification of 100 times. With respect to the obtained image, bubble diameters of all the bubbles and opening diameters of all the open-cell bubbles that are present in an arbitrary range of the cross-section are measured using image analyzing software. The average bubble diameter and the average opening diameter are calculated based on the average values of the measured values.

The independent-bubble ratio of the foamed body constituting the polymer matrix layer 3 is preferably from 5 to 70%. This allows that excellent stability of the sensor can be exhibited while ensuring the compressibility of the polymer matrix layer 3. Also, the volume fraction of the filler (magnetic filler in the present embodiment) relative to the foamed body constituting the polymer matrix layer 3 is preferably from 1 to 30 vol %.

The polyurethane resin foam described above can be produced by an ordinary method of producing a polyurethane resin foam except that the polyurethane resin foam contains a magnetic filler. The method of producing a polyurethane resin foam containing the magnetic filler includes, for example, the following steps (i) to (v).

(i) Step of forming an isocyanate-group-containing urethane prepolymer from a polyisocyanate component and an active hydrogen component (ii) Primary stirring step of mixing and preliminarily stirring the isocyanate-group-containing urethane prepolymer, a foam stabilizer, a catalyst, and a magnetic filler, and vigorously stirring the mixture in a non-reactive gas atmosphere so as to incorporate bubbles into the mixture (iii) Step of further adding an active hydrogen component and performing secondary stirring to prepare a bubble dispersion urethane composition containing the magnetic filler (iv) Step of molding the bubble dispersion urethane composition into a desired shape and curing the composition to fabricate a urethane resin foam containing the magnetic filler (v) Step of magnetizing the urethane resin foam to form a magnetic urethane resin foam As a method for producing a polyurethane resin foam, a chemical foaming method using a reactive foaming agent such as water is known. However, it is preferable to use a mechanical foaming method of mechanically stirring the mixture under a non-reactive gas atmosphere as in the above step (ii). The mechanical foaming method facilitates the molding operation as compared with the chemical foaming method. Also, because water is not used as the foaming agent, a molded body having fine bubbles and being tough and excellent in repulsion elasticity (restorability) and the like can be obtained.

First, an isocyanate-group-containing urethane prepolymer is formed from a polyisocyanate component and an active hydrogen component, as described in the above step (i). Next, the isocyanate-group-containing urethane prepolymer, a foam stabilizer, a catalyst, and a magnetic filler are mixed and preliminarily stirred, and the mixture is vigorously stirred in a non-reactive gas atmosphere so as to incorporate bubbles into the mixture, as described in the above step (ii), and an active hydrogen component is further added and stirred to prepare a bubble dispersion urethane composition containing the magnetic filler, as described in the above step (iii). As described in the above steps (i) to (iii), in a polyurethane resin foam containing a polyisocyanate component, an active hydrogen component, and a catalyst, a method of forming the polyurethane resin foam after preliminarily forming an isocyanate-group-containing urethane prepolymer is known to those skilled in the art, and the production conditions can be suitably selected in accordance with the materials to be blended.

As the forming conditions in the above step (i), first, a blending ratio of the polyisocyanate component to the active hydrogen component is selected so that the ratio of the isocyanate group in the polyisocyanate component to the active hydrogen group in the active hydrogen component (isocyanate group active hydrogen group) will be from 1.5 to 5, preferably from 1.7 to 2.3. Also, the reaction temperature is preferably from 60 to 120° C., and the reaction time is preferably from 3 to 8 hours. Further, a urethanization catalyst or an organic catalyst conventionally known in the art, for example, lead octylate commercially available under a trade name of "BTT-24" from Toei Chemical Industry CO., Ltd., "TEDA-L33" manufactured by Tosoh Corporation, "NIAX CATALYST A1" manufactured by Momentive Performance Materials Inc., "KAOLIZER NO. 1" manufactured by Mao Corporation, "DABCO T-9" manufactured by Air Products and Chemicals, Inc., or the like may be used. As an apparatus to be used in the above step (i), one capable of mixing and stirring the above materials and reacting the materials under the conditions as described above can be used, and an apparatus generally used for production of polyurethane can be used.

As a method for performing the preliminary stirring in the above step (ii), there can be mentioned a method of using a general mixer that can mix a liquid resin with a filler, and examples thereof include a homogenizer, a dissolver, and a planetary mixer.

By adding the foam stabilizer to the isocyanate-group-containing urethane prepolymer having a high viscosity and performing the stirring (primary stirring) in the above step (ii), and further adding the active hydrogen component and performing the secondary stirring in the above step (iii), the bubbles that have been incorporated into the reaction system become less likely to escape, so that an efficient foaming operation can be advantageously carried out.

The non-reactive gas in the above step (ii) is preferably a gas that is not combustible, and specific examples thereof include nitrogen, oxygen, carbon dioxide, rare gases such as helium and argon, and a mixed gas of these. Use of air that has been dried to remove moisture therefrom is the most preferable. Also, With respect to the conditions for the above primary stirring and secondary stirring, particularly for the primary stirring, conditions in producing a urethane foam by an ordinary mechanical foaming method can be used, so that the conditions are not particularly limited; however, vigorous stirring is carried out for 1 to 30 minutes at a rotation number of 1000 to 10000 rpm by using a stirring blade or a mixer having a stirring blade. Examples of such an apparatus include a homogenizer, a dissolver, and a mechanical froth foaming machine.

A method of molding the bubble dispersion urethane composition into a desired shape such as a sheet form in the above step (iv) is also not particularly limited. For example, it is possible to use a batch molding method in which the above mixture liquid is injected into a mold that has been subjected to a releasing treatment and cured, or a continuous molding method in which the above bubble dispersion urethane composition is continuously supplied onto a face material that has been subjected to a releasing treatment and cured. Also, the above curing conditions are not particularly limited, and curing at 60 to 200° C. for 10 minutes to 24 hours is preferable. When the curing temperature is too high, the resin foam is deteriorated by heat, thereby the mechanical strength is deteriorated. When the curing temperature is too low, the resin foam is insufficiently cured. Also, when the curing time is too long, the resin foam is deteriorated by heat, thereby the mechanical strength is deteriorated. When the curing time is too short, the resin foam is insufficiently cured.

In the above step (v), a method of magnetizing the magnetic filler is not particularly limited, so that the magnetization can be carried out by using a magnetizing apparatus that is generally used, for example, "ES-10100-15SH" manufactured by Denshijiki industry Co., Ltd., or "TM-YS4E" manufactured by Tamakawa Co., Ltd. Typically, a magnetic field having a magnetic flux density of 1 to 3 T is applied. The magnetic filler may be added, after magnetization, in the above step (ii) of forming the magnetic filler dispersion liquid. However, it is preferable to perform the magnetization in the above step (v) in view of the handling workability of the magnetic filler in the midway steps, for example.

As already described, in the present embodiment, the polymer matrix layer 3 is mounted in a compressed state so as to be sandwiched between adjacent cells 2 as shorn in FIG. 2 or between the cell 2 and the case 11 that accommodates the cell 2 as shown in FIG. 3. Further, when the cell 2 swells to deform the polymer matrix layer 3, change in the external field accompanying the deformation of the polymer matrix layer 3 is detected, and deformation of the secondary battery is detected on the basis thereof.

The present invention is not limited to the embodiment mentioned above, but can be improved and modified variously within the scope of the present invention.

In the above-described embodiment, an example in which the polymer matrix layer 3 is sandwiched in a gap between adjacent cells 2 (see FIG. 2) and an example in which the polymer matrix layer 3 is sandwiched in a gap between the cell 2 and the case 11 (see FIG. 3) have been shown; however, the present invention is not limited to these. For example, the polymer matrix layer may be sandwiched between a case of a battery module and a case of a battery module adjacent thereto included in a battery pack, that is, in a gap between the cases of adjacent battery modules, and this is particularly useful in a battery module of a laminate film type. Alternatively, the polymer matrix layer may be sandwiched in a gap between a case of a battery module and a case of a battery pack.

In the above-described embodiment, an example in which change in the magnetic field is used has been shown; however, a construction in which change in another external field such as the electric field is used can be likewise adopted. For example, a construction may be considered in which the polymer matrix layer contains an electroconductive filler such as metal particles, carbon black, or carbon nanotubes as the filler, and the detection unit detects change in the electric field (change in the resistance and the dielectric constant) as the external field.

EXAMPLES

Hereinafter, Examples of the present invention will be described; however, the present invention is not limited to these alone.

The following source materials were used for production of a magnetic polyurethane resin foam (one of magnetic elastomers containing a polyurethane elastomer as an elastomer component) that forms the polymer matrix layer.

TDI-80: toluene diisocyanate (manufactured by Mitsui Chemicals, Inc., 2,4-isomer=8.0%, COSMONATE T-8.0)

Polyol 3-methyl-1,5-pentane adipate, hydroxyl value of 56, number of functional groups being 2 (manufactured by Kuraray Co., Ltd., P-2010)

Polyol B: polyester polyol produced from 3-methyl-1,5-pentanediol, trimethylolpropane, and adipic acid as starting materials, hydroxyl value of 56, number of functional groups being 3 (manufactured by Kuraray Co., Ltd., F-3010)

Polyol C: polyester polyol produced from 3-methyl-1,5-pentanediol, trimethylolpropane, and adipic acid as starting materials, hydroxyl value of 84, number of functional groups being 3 (manufactured by Kuraray Co., Ltd., F-2010)

Polyol D: polyester polyol produced from 3-methyl-1,5-pentanediol, trimethylolpropane, and adipic acid as starting materials, hydroxyl value of 168, number of functional groups being 3 (manufactured by Kuraray Co., Ltd., F-1010)

Lead octylate: lead octylate 24% (manufactured by Toei Chemical Industry Co., Ltd., BTT-24)

Neodymium-based filler: MF-15P (average particle size of 33 μm, manufactured by Aichi Steel Corporation)

Samarium-based filler: SmFeN alloy fine powder (average particle size of 2.5 μm, manufactured by Sumitomo Metal Mining Co., Ltd.)

Foam stabilizer: silicone-based surfactant (manufactured by Dow Corning Toray Co., Ltd., L-5340)

Also, the prepolymer A shown in Table 1 was used as the prepolymer.

TABLE 1

| Prepolymer A | TDI-80 | NCO % = 48.3% | 14.8 |
|---|---|---|---|
| | Polyol A | OHV = 56 | 42.6 |
| | Polyol B | OHV = 56 | 42.6 |
| | | NCO % | 3.58 |

Example 1

Into a reaction container, 42.6 parts by weight of the polyol A (3-methyl-1,5-pentane adipate, hydroxyl value of 56, number of functional groups being 2, manufactured by Kuraray Co., Ltd., P-2010) and 42.6 parts by weight of the polyol B (polyester polyol produced from 3-methyl-1,5-pentanediol, trimethylolpropane, and adipic acid as starting materials, hydroxyl value of 56, number of functional groups being 3, manufactured by Kuraray Co., Ltd., F-3010) were put, and vacuum-dehydrated while being stirred for 1 hour. Thereafter, the inside of the reaction container was replaced with nitrogen. Subsequently, 14.8 parts by Weight of toluene diisocyanate (manufactured by Mitsui Chemicals, Inc., 2,4-isomer=80%, COSMONATE T-80) was added into the reaction container. While keeping the temperature of the inside of the reaction container at 80° C., the reaction was carried out for 2 hours to synthesize an isocyanate-terminated prepolymer A (NCO %=3.58%).

Next, 47.6 parts by weight of an NdFeB magnetic powder (manufactured by Aichi Steel Corporation, MF-15P) was added into a mixture liquid of 60.8 parts by weight of the prepolymer A, 4.8 parts by weight of a silicone-based foam stabilizer (manufactured by Dow Corning Toray Co., Ltd., L-5340), and 0.12 part by weight of lead octylate (manufactured by Toei Chemical Industry Co., Ltd., BTT-24), so as to prepare a filler dispersion liquid. This filler dispersion liquid was subjected to vigorous primary agitation for 5 minutes so as to take bubbles into the reaction system by using a stirring blade at a rotation number of 1000 rpm. Thereafter, 34.5 parts by weight of the polyol C (polyester polyol produced from 3-methyl-1,5-pentanediol, trimethylolpropane, and adipic acid as starting materials, hydroxyl value of 84, number of functional groups being 3, manufactured by Kuraray Co., Ltd., F-2010) was added, and the resultant was subjected to secondary agitation for 3 minutes to prepare a bubble dispersion urethane composition containing a magnetic filler.

The bubble dispersion urethane composition was dropped onto a PET film subjected to a releasing treatment and having a spacer, and the resultant was adjusted to have a thickness of 1.3 mm with use of a nip roll. Thereafter, curing was carried out at 80° C. for 1 hour, so as to obtain a polyurethane resin foam containing a magnetic filler. The obtained foam was magnetized at 2.0 T with use of a magnetizing apparatus (manufactured by Denshijiki industry Co., Ltd.) to obtain a magnetic polyurethane resin foam. The blended components and production conditions are shown in Table 2.

Examples 2 to 8 and Comparative Example 1

Magnetic polyurethane resins were obtained in the same manner as in Example 1 on the basis of the blended components and production conditions shown in Table 2.
(Measurement of Asker C Hardness)

The measurement was carried out in accordance with JIS K-7312. The fabricated magnetic polyurethane resin foam was cut to have a size of 50 mm×50 mm as a sample for measurement, and this was left to stand still in an environment with a temperature of 23±2° C. and a humidity of 50±5% for 16 hours. At the time of measurement, the samples were superposed to have a thickness of 10 mm or more. With use of a hardness tester (manufactured by Kobunshi Keiki Co., Ltd., Asker C type hardness tester, pressing surface height: 3 mm), the hardness was measured when 30 seconds had passed after the pressing surface was brought into Contact with the sample.
(Measurement of Bubble Content Ratio)

The specific gravity measurement was carried out in accordance with JIS Z-8807-1976. From this value and the value of the specific gravity of a non-foamed body, the bubble content ratio was calculated. For the specific gravity measurement, the fabricated magnetic polyurethane resin foam was cut to have a size of 40 mm×75 mm as a sample for measurement, and this was left to stand still in an environment with a temperature of 23±2° C. and a humidity of 50±5% for 16 hours. Thereafter, the specific gravity measurement was carried out with use of a specific gravimeter (manufactured by Sartorius Japan K. K., LA-230S).
(Measurement of Average Bubble Diameter and Average Opening Diameter)

A cross-section of the fabricated magnetic polyurethane resin foam was observed at a magnification of 100 times using a scanning electron microscope (SEM) (manufactured by Hitachi Science Systems Co., Ltd., S-3500N). With respect to the obtained image, bubble diameters and opening diameters in an arbitrary range were measured using image analyzing software (manufactured by Mitani Corporation, WinROOF), and an average bubble diameter and an average opening diameter were calculated from the measured values.
(Measurement of Independent-Bubble Ratio)

The fabricated magnetic polyurethane resin foam was cut to have a size of 20 mm×20 mm, and measurement was carried out using an air comparison pycnometer 930 type (manufactured by Beckman Co., Ltd.). The independent-bubble ratio was calculated by the following formula on the basis of a counter value obtained by the measurement and a sample volume value.

Independent-bubble ratio (%)=(counter value/sample volume value)×100

(Evaluation of Sensor Characteristics)

Figure 4:
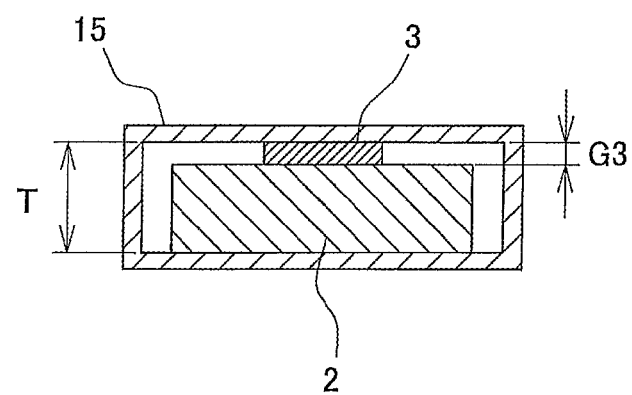
FIG. 4 is a sectional view schematically illustrating a structured article used in a vibration test.

The fabricated magnetic polyurethane resin foam was cut to have a size of 5 mm×30 mm and bonded to a cell of 1.44 Ah (size: longitudinal side of 90 mm×lateral side of 30 mm×thickness of 4 mm). As shown in FIG. 4, the above cell (cell 2) was accommodated in a case 15 made of an acrylic resin having a thickness T of the inside space of 5.0 mm, and the magnetic polyurethane resin foam (polymer matrix layer 3) was disposed in a gap G3 of 1.0 mm provided between the cell 2 and the case 15. The case was placed in a vibration testing machine, and a vibration test was carried out by giving a sine wave having an oscillation frequency of 200 Hz and an amplitude of 0.8 mm (total amplitude of 1.6 mm). The sine wave was applied in three directions that were perpendicular to one another each for 3 hours.

After the vibration test, a Hall element (manufactured by Asahi Kasei Microdevices Corporation, EQ-430L was mounted on an upper surface of the case. From a fully charged state (4.3 V), overcharging was carried out on the cell under the conditions of 2.88 Ah (2C), and the period of time until the magnetic flux density reached a predetermined value (1 gauss/sec) was measured. An average period of time (minutes) obtained by carrying out this test five times was determined as a sensor sensitivity. The shorter the period of time until the magnetic flux density reaches a predetermined value is, the higher the sensor sensitivity is. Further, the difference (minutes) between the longest period of time and the shortest period of time among the measured periods of time was determined as an index of stability of the sensor characteristics. The smaller this difference is, the more excellent the stability of the sensor characteristics is. The results are shown in Table 2.

TABLE 2

| | | | Example 1 | Example 2 | Example 3 | Example 4 | Example 5 | Example 6 | Example 7 | Example 8 | Comparative Example 1 |
|---|---|---|---|---|---|---|---|---|---|---|---|
| Blended components | Prepolymer | Prepolymer A | 60.8 | 60.8 | 60.8 | 60.8 | 60.8 | 60.8 | 49.1 | 74.2 | 60.8 |
| | Curing agent | Polyol B | — | — | — | — | — | — | 41.8 | — | — |
| | | Polyol C | 34.5 | 34.5 | 34.5 | 34.5 | 34.5 | 34.5 | — | — | 34.5 |
| | | Polyol D | — | — | — | — | — | — | — | 21.1 | — |
| | Filler | Neodymium-based | 47.6 | 47.6 | 47.6 | 112.3 | 28.6 | 47.6 | 140.9 | 25.9 | 47.6 |
| | Catalyst | Lead octylate | 0.12 | 1.12 | 2.12 | 0.12 | 0.12 | 0.12 | 0.12 | 0.12 | 0.12 |
| | Foam stabilizer | L-5340 | 4.8 | 4.8 | 4.8 | 4.7 | 4.7 | 4.7 | 9.1 | 4.8 | 4.7 |
| | NCO index | | 1.00 | 1.00 | 1.00 | 1.00 | 1.00 | 1.00 | 1.00 | 1.00 | 1.00 |
| | Filler content ratio (vol %) | | 3.0 | 3.0 | 3.0 | 3.0 | 3.0 | 3.0 | 3.0 | 3.0 | 3.0 |

TABLE 2-continued

|  |  | Example 1 | Example 2 | Example 3 | Example 4 | Example 5 | Example 6 | Example 7 | Example 8 | Comparative Example 1 |
|---|---|---|---|---|---|---|---|---|---|---|
| Production Conditions | Primary agitation time (minutes) | 5 | 5 | 5 | 10 | 3 | 5 | 10 | 3 | 5 |
|  | Secondary agitation time (minutes) | 3 | 3 | 3 | 3 | 5 | 3 | 3 | 3 | 3 |
|  | Thickness of polymer matrix layer (mm) | 1.3 | 1.8 | 1.1 | 1.3 | 1.3 | 2.1 | 1.3 | 1.8 | 0.9 |
| Results | Asker C hardness | 21 | 21 | 21 | 5 | 45 | 21 | 0.5 | 61 | 21 |
|  | Bubble content ratio (vol %) | 52.9 | 52.9 | 52.9 | 78.3 | 23.6 | 52.9 | 82.1 | 15.9 | 52.9 |
|  | Average bubble diameter (μm) | 132 | 132 | 132 | 249 | 76 | 132 | 336 | 48 | 132 |
|  | Average opening diameter (μm) | 53 | 53 | 53 | 79 | 21 | 53 | 116 | 14 | 53 |
|  | Independent-bubble ratio (%) | 22.6 | 22.6 | 22.6 | 8.9 | 65.9 | 22.6 | 3.8 | 78.4 | 22.6 |
|  | Sensor sensitivity (minutes) | 39.4 | 40.6 | 39.2 | 39.1 | 41.9 | 43.3 | 40.8 | 42.1 | 43.9 |
|  | Stability (minutes) | 1.3 | 1.1 | 1.6 | 2.1 | 0.8 | 0.7 | 2.4 | 0.6 | 2.8 |

In Comparative Example 1, both the sensor sensitivity and the stability were comparatively low. This shows that, because the thickness of the magnetic polyurethane resin foam is smaller than the gap, there seem to be samples in which positional shift had occurred during the vibration test. In contrast, in Examples 1 to 8, comparatively excellent sensor sensitivity and stability Were exhibited. With regard to the sensor sensitivity, there is a fear of ignition if the measured period of time exceeds 45 or 46 minutes; however, in all of the examples, the sensing was possible in a period of time shorter than that. In Examples 6 to 8, both the sensor sensitivity and the stability were at a usable level, though the sensor sensitivity or the stability decreased slightly.

DESCRIPTION OF REFERENCE SIGNS

1 Battery module
2 Cell
3 Polymer matrix layer
4 Detection unit
11 Case

The invention claimed is:

1. A deformation detection sensor for a sealed secondary battery, comprising a polymer matrix layer and a detection unit, wherein
the polymer matrix layer contains a filler that is dispersed therein and that changes an external field in accordance with deformation of the polymer matrix layer, and the detection unit detects change in the external field;
the polymer matrix layer is sandwiched in a gap and mounted in a compressed state; and
wherein
the polymer matrix layer contains a magnetic filler as the filler, and
the detection unit detects change in a magnetic field as the external field.

2. The deformation detection sensor for a sealed secondary battery according to claim 1, wherein a compression ratio of the polymer matrix layer is from 1.05 to 2.0.

3. The deformation detection sensor for a sealed secondary battery according to claim 1, wherein an Asker C hardness of the polymer matrix layer is from 1 to 50.

4. The deformation detection sensor for a sealed secondary battery according to claim 1, wherein the polymer matrix layer is a foamed body containing bubbles.

5. The deformation detection sensor for a sealed secondary battery according to claim 4, wherein a bubble content ratio of the foamed body is from 20 to 80 vol %.

6. The deformation detection sensor for a sealed secondary battery according to claim 4, wherein an average bubble diameter of the foamed body is from 50 to 300 μm.

7. The deformation detection sensor for a sealed secondary battery according to claim 4, wherein an independent-bubble ratio of the foamed body is from 5 to 70%.

8. A sealed secondary battery comprising the deformation detection sensor according to claim 1 mounted thereon.

9. A deformation detection method for a sealed secondary battery, in which a polymer matrix layer is mounted in a compressed state in a form of being sandwiched in a gap, and the polymer matrix layer contains a filler that is dispersed therein and that changes an external field in accordance with deformation of the polymer matrix layer, the method comprising:
detecting change in the external field accompanying the deformation of the polymer matrix layer, and detecting deformation of the sealed secondary battery on a basis of the detected change in the external field; and
wherein
the polymer matrix layer contains a magnetic filler as the filler, and
the detection unit detects change in a magnetic field as the external field.

10. The deformation detection method for a sealed secondary battery according to claim 9, wherein a compression ratio of the polymer matrix layer is from 1.05 to 2.0.

* * * * *